Nov. 1, 1932.          C. C. GATES          1,885,708
MACHINE FOR MAKING BELTS
Filed Dec. 4, 1931          3 Sheets-Sheet 1
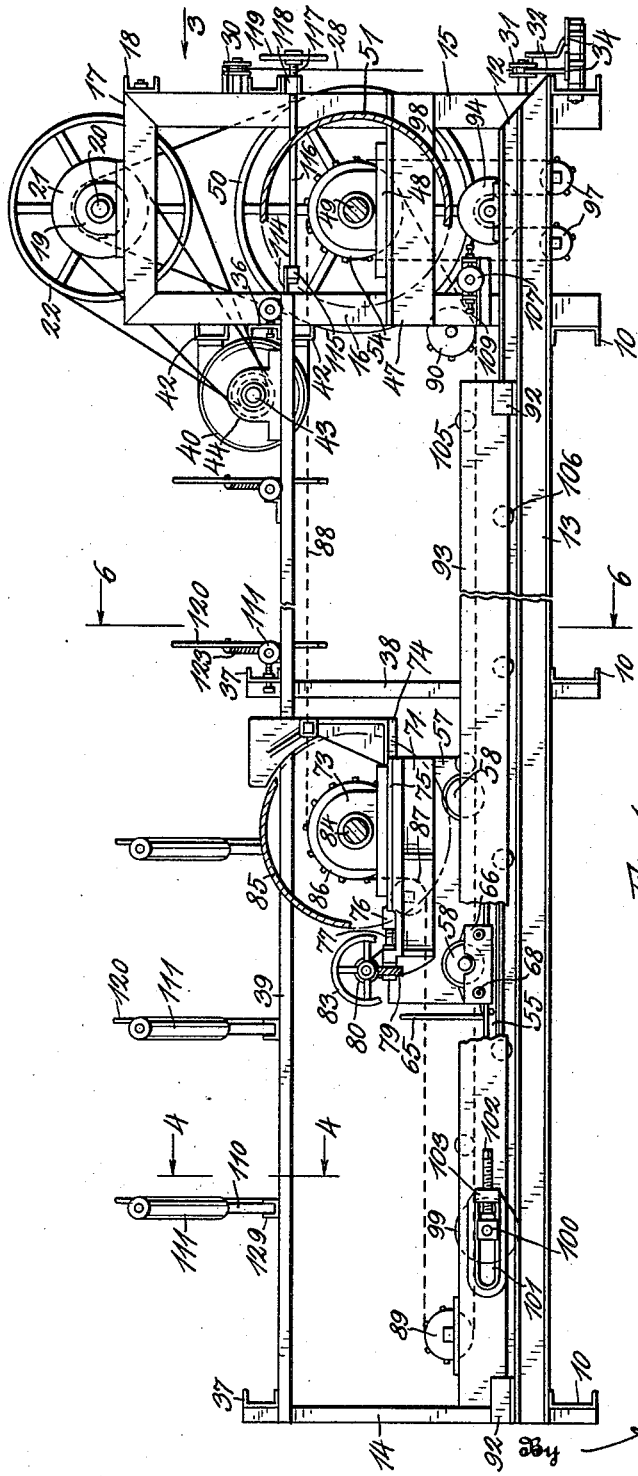
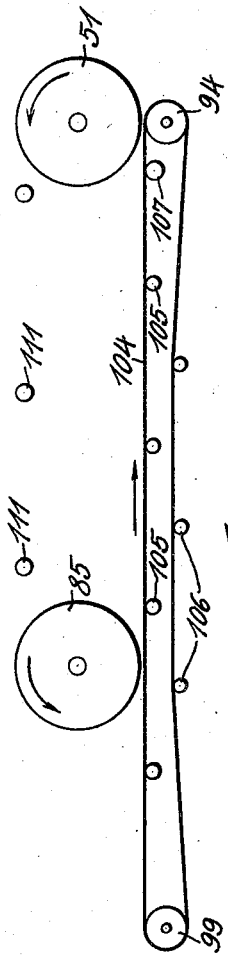
Inventor
Charles C. Gates.
By
Attorney Nov. 1, 1932.  C. C. GATES  1,885,708
MACHINE FOR MAKING BELTS
Filed Dec. 4, 1931   3 Sheets-Sheet 2
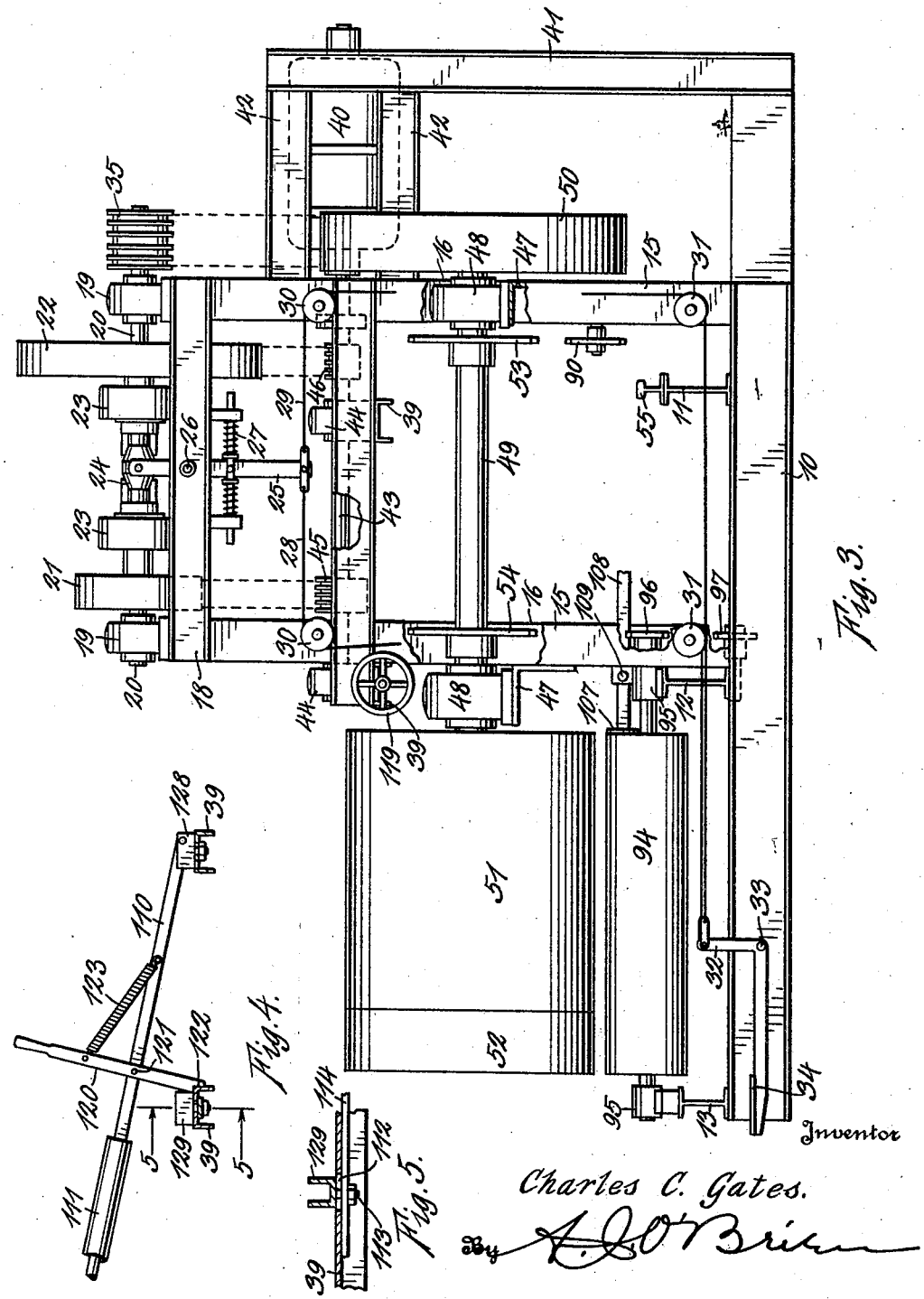

Inventor
Charles C. Gates.
By A. J. O'Brien
Attorney

Patented Nov. 1, 1932

1,885,708

UNITED STATES PATENT OFFICE

CHARLES C. GATES, OF DENVER, COLORADO

MACHINE FOR MAKING BELTS

Application filed December 4, 1931. Serial No. 579,062.

This invention relates to improvements in machines for making belts and has reference more particularly to a machine for making long belts from rubberized cord and woven fabric.

In the transmission of power, it is becoming increasingly prevalent to employ belts of the type known as V-shaped belts, instead of the ordinary flat belts. Where a large amount of power is transmitted, a number of V-shaped belts can be applied side by side, and in this way any amount of power can be safely transmitted.

In my copending application, Serial No. 579,063, filed Dec. 4, 1931, I have described and claimed a machine for making belts of the V-shaped type and which is especially well adapted for belts of moderate length. The machine that forms the subject of the present invention is constructed along the broad lines disclosed in the application above identified, but is designed more particularly for use in the manufacture of long belts.

In the manufacture of belts of this type, it is necessary to prevent the materials from being subjected to excessive strains before the rubber has been cured and therefore when comparatively long belts are made, it is necessary to provide means for supporting the material so as to prevent excessive strains from being developed and one object of the present invention is to produce a machine having means for this purpose.

The above and other objects that may become apparent as this description proceeds are attained by means of a construction and an arrangement of parts that will be described in detail, and for this purpose reference will be had to the accompanying drawings in which the preferred embodiment of the invention has been illustrated, and in which:

Fig. 1 is a side elevation of the improved belt making machine, portions being shown in section to better disclose the construction;

Fig. 2 is a diagram showing the relationship of the drums to the conveyor belt that is located below them;

Fig. 3 is an end view looking in the direction of arrow 3, Fig. 1;

Fig. 4 is a section taken on line 4—4, Fig. 1, and shows the means employed for supporting one of the rollers in inoperative position;

Fig. 5 is a section taken on line 5—5, Fig. 4;

Figure 6:
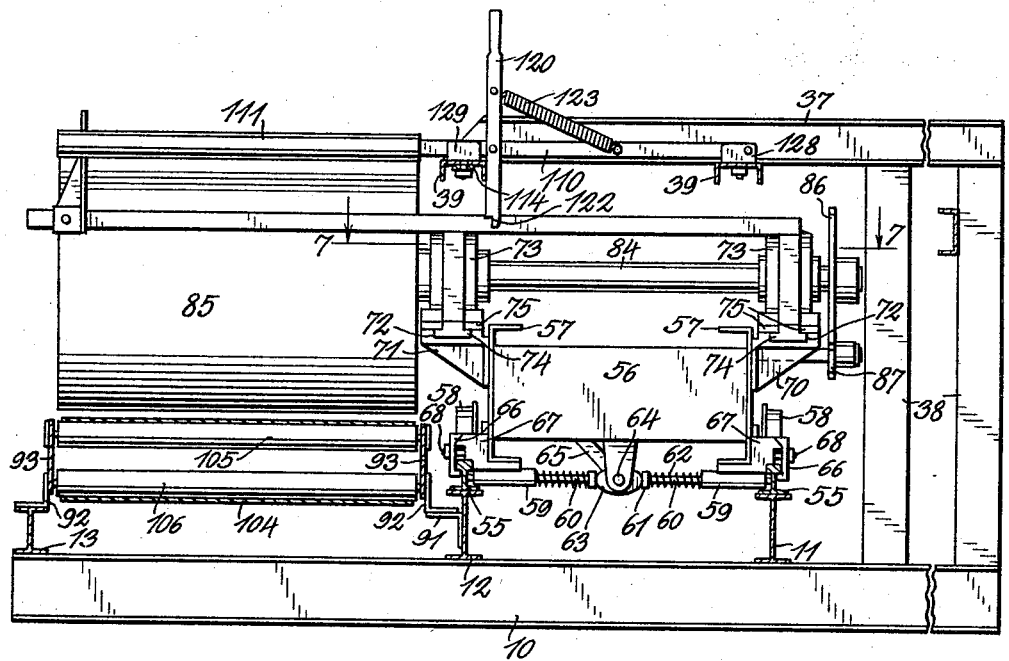
Fig. 6 is a section taken on line 6—6, Fig. 1.

The machine comprises a framework having a number of transversely extending channel beams 10 that rest upon the floor or surface on which the machine is supported. Extending transversely of the members 10 are I-beams 11, 12 and 13. The I-beams 11 and 12 are of the same size and are wider than the I-beam 13 as shown in Fig. 3. At each end of the framework, vertical supports 14 and 15 have been provided. At the end where the supports 15 are located, another pair of vertical supports 16 are provided, and these are spaced a short distance from supports 15 and have their upper ends connected by steel channels 17 in the manner shown in Fig. 1. The upper ends of supports 15 are connected by means of a transverse member 18. Secured to the top of the frame members 17 are bearings 19 in which is journaled a shaft 20. This shaft 20 has two pulleys 21 and 22 that are rotatably secured to the shaft and with each of which is associated a clutch 23. These clutches are so arranged that either one or the other can be made operative so as to connect either one of the pulleys 21 or 22 to the shaft. The clutch operating means comprises a double ended cone 24 that can be shifted longitudinally by means of a lever 25. This lever is pivoted at 26 and is held in inoperative position by means of springs 27. Secured to the lower end of lever 25 are steel cables 28 and 29 that pass over pulleys 30 and 31 and have their ends connected to the upper ends 32 of bell crank levers that are mounted for movement about pivots 33. The other ends of these bell crank levers have pedals 34 and the operator by exerting pressure on one or the other of these pedals can operate either one of the clutches. One end of shaft 20 has a grooved pulley 35, to which reference will be made hereinafter. Secured to the upright 16 is a channel 36 and another channel iron 37 is secured to the upper ends of uprights 14 at the same distance from the supporting surface. Located intermediate the uprights 14 and 16 are other uprights 38 to which transverse channel irons 37 are secured. Secured to the lower flanges of the transverse channel irons 37 are longitudinally extending channel irons 39. By referring to Fig. 3, it will be seen that the uprights 14, 15 and 16 are so located with respect to transverse members 10 that the latter projects to one side of these uprights. For the purpose of supporting the motor 40, other upright supports 41 have been provided to one side of one of the uprights 15 and 16 and these are connected with one of the uprights 16 by means of channel irons 42. The motor is provided with a drive shaft 43 that is journalled in bearings 44 and which is provided intermediate its ends with grooved pulleys 45 and 46. Pulley 45 is connected with pulley 21 by means of a number of V-shaped belts and pulley 46 is connected to pulley 22 in the same manner. Owing to the difference in size between the pulleys 21 and 22 and also to the difference in the diameter of pulleys 45 and 46, it will be seen that when shaft 20 is driven through 45, it will rotate at a faster speed than when it is driven through pulley 46. Extending between the corresponding uprights 15 and 16, are angle iron brackets 47, on which bearings 48 are supported. A shaft 49 is mounted for rotation in bearings 48 and secured to one end of this shaft is pulley 50. The grooved pulley 35 is connected with pulley 50 by means of a number of V-shaped belts. Shaft 49 extends to one side of the vertical supports and carries a drum 51. The outer end of this drum has been designated by reference numeral 52 and this is made detachable and has its outer surface covered with a rubber composition for a purpose which will hereinafter appear. Secured to the shaft 49 are sprocket wheels 53 and 54.

Supported on the upper flanges of angle irons 11 and 12, are rails 55 of the type employed in connection with mine railroads. By referring to Figs. 6 and 7, it will be seen that there is supported on the rails 55, a movable carriage. This carriage comprises a rectangular frame having transverse members 56 and side members 57. Rotatably connected with the frame are four flanged wheels 58 that rest on the rails 55. The webs of the rails 55 are provided with openings and one of the end members 56 is provided with two bearings 59, in which plungers 60 are reciprocably mounted. Each of these plungers has its inner end provided with a head 61 and a spring 62 is located between each head and the inner end of the bearing 69. Located between the two heads 61 is a cam 63. This is mounted for rotation about a pivot 64 and has a handle 65. When the cam is in the position shown in Figs. 6 and 7, the plungers 60 extend through holes in the webs of the rails and positively hold the carriage against movement with respect to the latter. In addition to the clamping action of the plungers, clamps 66 have been provided. These clamps are each secured to a member 67 by means of bolts 68 and when the latter are tightened, the clamps 66 will be forced against the rails and positively hold the carriage against movement.

Figure 7:
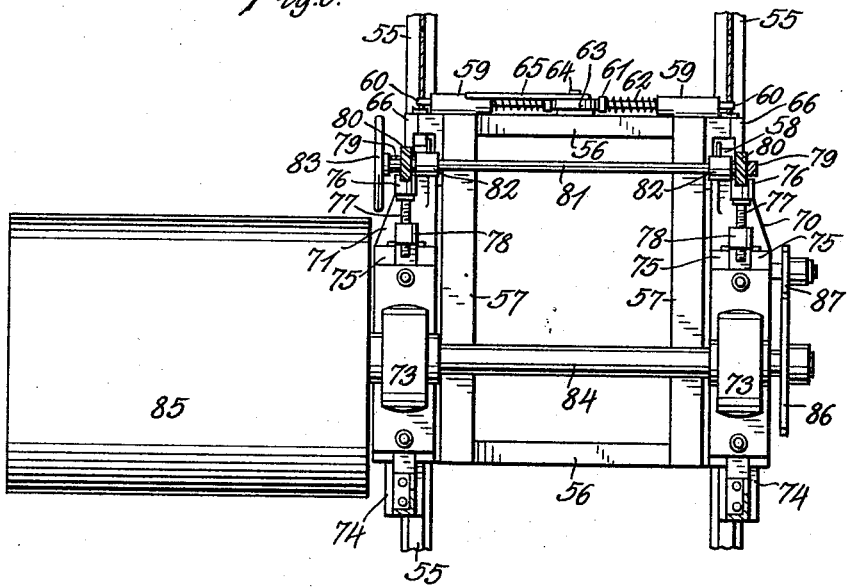
Fig. 7 is a top plan view of the movable carriage to which one of the drums is secured.

From Fig. 6 it will be seen that the rectangular frame comprises two channel end members 56 secured to the webs of two channel irons 57. The members 67 referred to above are attached to the lower flanges of channel irons 57 in the manner shown. Secured to the outside of channel irons 57 are brackets 70 and 71. These brackets are substantial duplicates of each other with the exception that one is a right and the other is a left. The upper surface of each of the brackets 70 and 71 is provided with a slot 72 that extends longitudinally thereof. Supported on each of the brackets 70 and 71 is a bearing block 73. The lower surfaces of these bearing blocks are provided with projections 74 that fit in the slots 72 and these bearing blocks are held in place by means of plates 75. The upper surface of each of the brackets 70 and 71, is provided with a bearing 76 in which is rotatably mounted a screw 77. These screws are held against longitudinal movement and have threaded engagement with openings in lugs 78 that are attached to the bearing blocks. Each screw 77 has a spiral gear 79 attached to it, and this is engaged by a cooperating spiral gear 80 carried by a shaft 81 that is journalled in bearings 82. One end of this shaft has a hand wheel 83 and when this shaft is turned, the two screws 77 are rotated simultaneously and in the same direction and move the bearing blocks on the brackets 70 and 71 so as to effect an adjustment of the distance between shaft 49 and shaft 84. Shaft 84 is journalled in the bearings 73 and has a drum 85 secured to the end that projects to one side of the carriage. The end of shaft 84 opposite from that to which the drum is attached has a sprocket wheel 86 and a small sprocket wheel 87 is attached to the carriage. The shafts 49 and 84 are mounted with their axes parallel to each other and are preferably at the same distance from the bottom of the frame. It will be seen that the carriage can be moved along the track comprising the rails 55 and can be secured against movement by means of the plungers and the clamps above described. A sprocket chain 88 encloses the sprocket wheels 53 and 86 and extends underneath the sprocket wheel 87 and then passes around a sprocket wheel 89 that is secured to the framework adjacent the supports 14. From sprocket 89 the chain extends rearwardly to the sprocket wheel 90 and thence upwardly to sprocket wheel 53. It will be seen from an inspection of Fig. 1 that the movement of the carriage to which shaft 84 is secured does not alter the length of the chain and the latter will therefore operate satisfactorily wherever the shaft supporting carriage is located.

Secured to the outer surface of the web of angle iron 12 are angle brackets 91 to which an angle iron 92 is secured. A corresponding angle 92 is secured to the upper flange of the I-beam 13. Attached to the vertical flanges of angle irons 92, are plates 93. A roller 94 is located directly beneath the shaft 49 and is journaled in bearings 95. The inner end of this roller is provided with a sprocket wheel 96. Two sprocket wheels 97 are rotatably secured to the framework directly beneath the sprocket wheel 96 and spaced to the sides of the latter. A sprocket chain 98 extends over the sprocket wheel 54 on shaft 49 and passes downwardly underneath the sprocket wheels 97 and thence upwardly and over the sprocket wheel 96. Whenever shaft 49 is rotated, the roller 94 will be rotated in the opposite direction, as can be readily seen from an inspection of Fig. 1. A roller 99 is mounted for rotation in bearing 100, and these bearings are slidably mounted in longitudinally extending openings 101 in the plates 93. Screws 102 have a threaded engagement with openings in blocks 103 and have their ends in contact with the bearing blocks 100. By means of screws 102 the position of the bearing blocks 100 can be adjusted. A canvas belt 104 encloses the two drums 94 and 99, as shown in Fig. 2. Mounted for rotation in suitable bearings, carried by the plates 93 are rollers 105 that serve to support the top of the conveyor 104. The inner portion of the conveyor is supported on rollers 106. The roller indicated by reference numeral 107 is located quite close to the drum 94 and this is carried on the outer end of a rod 108 whose position can be adjusted by means of screws 109. The purpose of this roller is to keep the conveyor belt properly centered on the drums because the latter are not crowned and therefore the conveyor will not run true unless adjusted by some other means and in this case this means is constituted by the roller 107.

Referring now to Figs 4 and 5, it will be seen that I have secured to the longitudinally extending channel irons 39, brackets 128 and 129. Pivotally attached to the brackets 128 are rods 110 to the outer ends of which rollers 111 are rotatably connected. The brackets indicated by 129 are U-shaped as shown in Fig. 5 and when the bars 110 are in the position shown in Fig. 6, they rest in the space between the two vertical portions of the U-shaped brackets. The channel iron on which brackets 129 rest is provided with a number of slots 112 and bolts 113 extend from the brackets 129 through these slots and through openings in a bar 114. The bar 114 extends the whole length of member 39 and is provided with a bearing 115 to which one end of the rod 116 is attached, as shown in Fig. 1. This rod has a threaded portion 117 that cooperates with a threaded opening in the bearing 118. Rod 116 has also a hand wheel 119 and by rotating this in one direction or the other, the bar 114 will be moved longitudinally, thereby changing the position of all of the U-shaped brackets 129 and these in turn will change the direction of the axes about which the rollers 111 turn. By means of the adjustment of the position of the axes of rollers 111, the material from which the belt is constructed, can be made to retain its proper position on the drums. Each of the bars 110 is provided with a lever 120 that is pivoted at 121 and has its lower end provided with a notch 122. A coil spring 123 tends to rotate this lever in a clockwise direction about its pivot. When any one of the rollers 111 are not employed, it is raised into the position shown in Fig. 4 and is held in this position by means of the lever 120.

Let us now assume that the machine has been constructed in the manner described and that it is to be used for forming the core material for belts. Since belts of the type to which this machine refers are made from layers of bias cut rubberized fabric separated by cord fabric, the first step is to properly space the drums 51 and 85 so as to get the proper length of belt. The machine is provided with a scale which has not been shown and by means of which the movable carriage can be adjusted to the position required for a belt of a given length and thickness. After the carriage has been moved to the position indicated and clamped in position by means of the plungers 60 and the clamping plates 66, any further adjustment is made by rotating shaft 81 so as to move the bearing blocks 73. By the latter expedient adjustments are made for belts of different thicknesses, but of the same general length. After the drum 85 has been adjusted and properly clamped in position, as above explained, the motor is started and this rotates both drums in a counterclockwise direction when viewed as shown in Figs. 1 and 2. The sprocket wheels 54 and 86 are both of the same diameter and therefore the two drums will rotate at the same speed and since the drums have the same outside diameter, they will rotate at the same peripheral velocity. After the parts have been set in motion, a strip of bias cut rubberized fabric is laid on top of drum 51 and then carried over rollers 111 untill it reaches drum 85 and the fabric is then brought downwardly and onto the top of the conveyor 104 by means of which it is carried back to drum 51. The end of the fabric is passed upwardly over the drum 51 and underneath the strip that is fed onto this drum. After the fabric has been formed into a complete loop, the drums are slowly rotated and the fabric is applied under a constant tension until the required number of layers have been put in place, after which the fabric is cut and one or more layers of latex-treated cord is put in place, and this in turn is covered with layers of bias cut rubberized fabric.

During the wrapping of the cord and fabric, the material between the drums is supported by the rollers 111 and by the conveyor 104 so that the weight of the material will not subject it to undue strains. After the material has been arranged in layers as above described, it is separated into narrow strips by means of a cutting device which has not been shown and described in this application because this device has been illustrated in the copending application above identified.

It will be seen from the above description that by means of the mechanism shown on the drawings and which forms the subject of this invention, it is possible to form the cores for V-shaped belts of the type under consideration of any length desired without subjecting the material to undue strains and this makes it possible to construct belts of the proper length and of any size. After the cores have been cut into strips, they are covered with bias cut fabric as described in other applications filed by me, after which they are subjected to heat and pressure for the purpose of giving them the required cure.

Having described the invention what is claimed as new is:

1. A belt making machine comprising, in combination, an elongated frame having two parallel supporting rails extending longitudinally thereof, a carriage mounted on the rails and movable therealong, means for interconnecting the carriage and the rails at predetermined points, a bearing block supported by the carriage, two bearings carried by the bearing block, a shaft mounted for rotation in the bearings, one end of the shaft projecting from one side of the carriage, a drum on the projecting end of the shaft, means for moving the shaft in a horizontal plane parallel with the axis of the shaft, another shaft mounted for rotation near one end of the frame, the two shafts being parallel, a drum on the second mentioned shaft, means for rotating the two drums simultaneously in the same direction and at the same peripheral speed and a belt conveyor located below the drums and parallel to a plane tangent to the two drums.

2. A belt making machine comprising, in combination, an elongated frame having two parallel supporting rails extending longitudinally thereof, a carriage mounted on the rails and movable therealong, means for interconnecting the carriage and the rails at predetermined points, a bearing block supported by the carriage, two bearings carried by the bearing block, a shaft mounted for rotation in the bearings, one end of the shaft projecting from one side of the carriage, a drum on the projecting end of the shaft, means for moving the shaft with respect to the carriage, in a horizontal plane parallel with the axis of the shaft, another shaft mounted for rotation near one end of the frame, the two shafts being parallel, a drum on the second mentioned shaft, means for rotating the two drums simultaneously in the same direction and at the same peripheral speed, and a belt conveyor located below the drums and parallel to a plane tangent to the two drums.

3. A belt making machine comprising, in combination, an elongated frame having two parallel supporting rails extending longitudinally thereof, a carriage mounted on the rails and movable therealong, means for interconnecting the carriage and rails at predetermined points, a bearing block supported by the carriage, two bearings carried by the bearing block, a shaft mounted for rotation in the bearings, one end of the shaft projecting from one side of the carriage, a drum on the projecting end of the shaft, means for moving the shaft in a horizontal plane parallel with the axis of the shaft, another shaft mounted for rotation near one end of the frame, the two shafts being parallel, a drum on the second mentioned shaft, means for rotating the two drums simultaneously in the same direction and at the same peripheral speed, a belt conveyor located below the drums and parallel to a plane tangent to the two drums, and means for moving the conveyor at the same speed as the peripheral velocity of the drums.

4. A belt making machine comprising, in combination, an elongated frame having two parallel supporting rails extending longitudinally thereof, a carriage mounted on the rails and movable therealong, means for interconnecting the carriage and the rails at predetermined points, a shaft rotatably mounted on the carriage and projecting from one side thereof, a drum secured to the shaft, a shaft mounted on the frame near one end thereof, a drum carried by the shaft, the two shafts having their axes parallel, means for varying the distance between the shafts while the carriage remains stationary, means for rotating the two drums simultaneously in the same direction and at the same peripheral speed, and a plurality of spaced freely rotatable rollers located below a plane tangent to the lower surfaces of the drums, the upper surfaces of the rollers being tangent to a plane parallel to the first mentioned plane.

5. A belt making machine comprising, in combination, an elongated frame having two parallel supporting rails extending longitudinally thereof, a carriage mounted on the rails and movable therealong, means for interconnecting the carriage and the rails at predetermined points, a shaft rotatably mounted on the carriage and projecting from one side thereof, a drum secured to the shaft, a shaft mounted on the frame near one end thereof, a drum carried by the shaft, the two shafts having their axes parallel, means varying the distance between the shafts while the carriage remains stationary, means for rotating the two drums simultaneously in the same direction and at the same peripheral speed, a plurality of spaced freely rotatable rollers located below a plane tangent to the lower surfaces of the drums, the upper surfaces of the rollers being tangent to a plane parallel to the first mentioned plane, a belt conveyor enclosing the rollers and means for moving the conveyor belt at a speed substantially equal to the peripheral speed of the drums.

In testimony whereof I affix my signature.

CHARLES C. GATES.